M. C. OVERMAN.
TIRE.
APPLICATION FILED JUNE 20, 1913.

1,264,205.

Patented Apr. 30, 1918.
2 SHEETS—SHEET 1.

Attest:
Edna A. Moreland
David M. Wood

Inventor:
by Max Cyrus Overman
E. A. Scherr Jr. Atty.

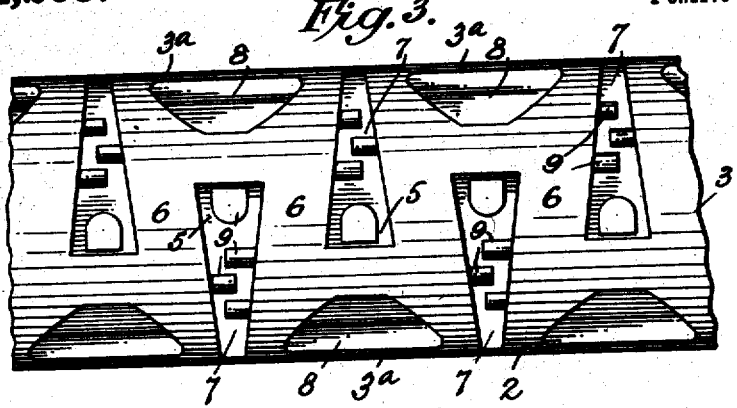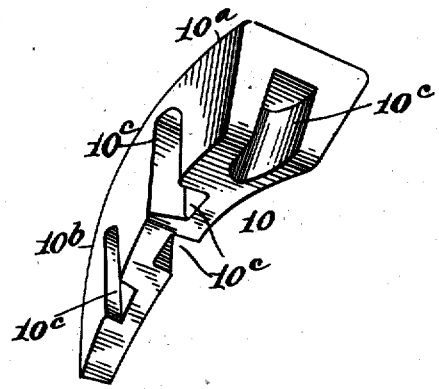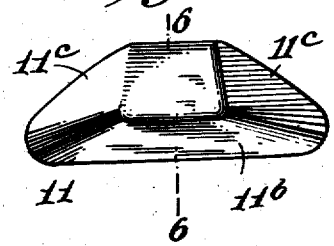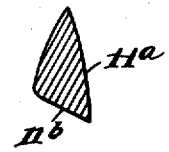

UNITED STATES PATENT OFFICE.

MAX CYRUS OVERMAN, OF NEW YORK, N. Y.

TIRE.

1,264,205.

Specification of Letters Patent.   Patented Apr. 30, 1918.

Application filed June 20, 1913.   Serial No. 774,818.

*To all whom it may concern:*

Be it known that I, MAX CYRUS OVERMAN, a citizen of the United States, residing at New York, in the county and State of New York, have invented certain new and useful Improvements in Tires, of which the following is a specification.

My present invention relates to improvements in pneumatic tires or shoes. The tire has an extra deep rubber nose- or tread-portion which minimizes the danger of puncture and which itself, by virtue of certain adaptations of grooves and recesses, is given such flexibilities and abilities to yield under load and work that in spite of its depth and mass it does not tear loose from the carcass. Further, these same adaptations prevent the heavy nose portion from throwing destructive bending action on the side walls of the tire by distributing this bending work throughout the height of said side walls instead of allowing it to concentrate destructively at any particular zone therein. Thus, my improvements minimize blow-outs at the sides of the tire. My improved tire further reduces the liability of blow-outs because its side walls can be saved from a great deal of bending work by making it possible to inflate the tire until it is hard,—that is, until it is blown up to the full pressure recommended for the particular size of tire,—and yet said tire will ride sufficiently easy due to the extra resiliency derived from the thick, recessed, cushioned tread of my tire.

Figure 1:
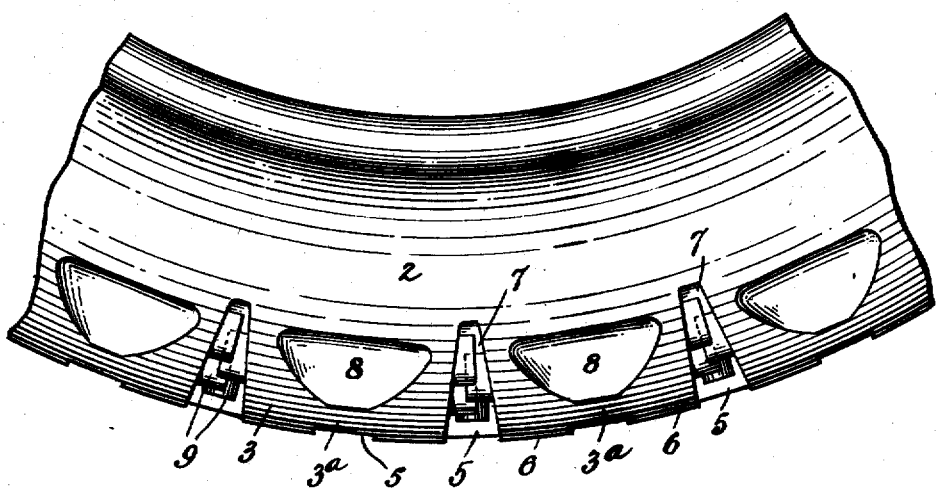
Figure 2:
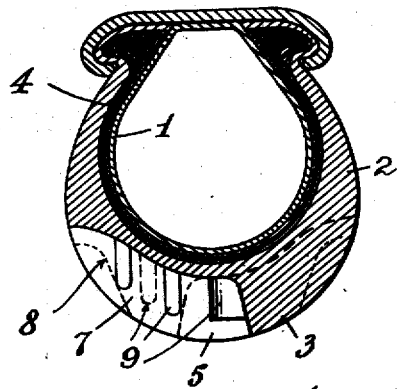

In the drawings showing one of the particular embodiments which my improvements in tires may take, Figure 1 is a fragment in side elevation of a pneumatic tire within my invention; Fig. 2 is a cross sectional view thereof; Fig. 3 is a plan view of the tread of the same tire; Fig. 4 is a perspective view on an enlarged scale compared to the previous figures, of one of the cores or inserts used in the manufacture of this tire for forming one of the transverse grooves, together with the pebble ejecting projections; Fig. 5 is a similarly enlarged perspective view of one of the cores or inserts used for forming the recesses 8; and Fig. 6 is a section on the line 6—6 in Fig. 5.

I will now describe the specific devices of the drawings, reserving it to the claims to point out the novel features and to define the scope of the invention, it being under-
stood that the claims will be given the due range of equivalents to which they may be entitled in view of the art.

The expressions herein directed to the up and down relationship of the parts of the tire refer to a section of the tire positioned as if in ground contact as in Fig. 2.

2 is a protective shoe for the inner tube 1 of a pneumatic tire. It comprises the ordinary fabric carcass 4 and my improved, greatly thickened nose-portion 3 as compared with the ordinary shoe, thereby so far separating the tread of the shoe from the inner tube as to minimize the liability of puncture. The nose-portion may be made of the regular pneumatic tire tread stock or any other rubber compound or compounds suitable for the purpose.

5—5 are frequently occurring grooves substantially as deep as the nose-portion, extending alternately from the sides of the shoe past the center of the tread (compare the plan view Fig. 3) in order to overlap each other. Said grooves become increasingly wide as they approach the tread and are especially wide at said tread.

In this way, the deep nose-portion is subdivided into numerous load-supporting parts 6 having flexibilities and abilities to flow or yield in every direction, longitudinally or laterally, thereby assisting in preventing the deep nose-portion from being torn off the carcass when the tire is in action.

8—8 are large area recesses or weakenings formed in the sides of the respective load-supporting parts 6. These recesses are deepest at a zone located between their top and bottom boundaries, and thence graduate in depth toward said boundaries and also graduate in depth toward their side boundaries; and at these boundaries the bottoms of the recesses meet with the rounded surface of the tire. Further, said boundaries of the individual recesses converge toward the tread.

The relatively massive nose-portion of my tire would throw undue bending work on the upper side walls, were it not for these large area recesses 8—8 which, as will be seen from a consideration of Fig. 2, act to distribute the bending so that it occurs more uniformly throughout the height of the side walls of the tire instead of concentrating destructively in any one zone in said walls.

Further, by permitting an easy distribution of the stresses created in the tire when in action, these same recesses 8 coöperate with the grooves 5 in preventing the nose-portion from tearing loose from the carcass.

9—9 are pebble ejecting nipples or projections extending integrally from the bottom and sides of each groove 5.

10 in Fig. 4 is the core or insert used in the manufacture of the tire for forming one of the transverse tread-grooves 5 and the pebble ejecting projections 9. When in use, the portion 10$^a$ of the insert is located at the central tread-portion of the tire being manufactured, and the portion 10$^b$ at the side of the tire, whereas the recesses 10$^c$ form the pebble-ejectors 9.

11 in Fig. 5 is a perspective view of the insert used in forming one of the spaces 8; and Fig. 6 is a section on the line 6—6 in Fig. 5. The concealed face of this insert in Fig. 5 and the curved face 11$^a$ in Fig. 6 is located at the curved outer periphery of the tire in course of manufacture; whereas the face 11$^b$ is the bottom of the insert; and 11$^c$ are its sides.

Having thus described my invention, what I claim is:

1. A pneumatic tire or shoe comprising a deep nose portion divided by frequent deep, transverse grooves, each extending from one side and terminating short of the other side, defining load-supporting parts, and recesses formed in the outer portions of the load supporting parts, said recesses being of less length than the grooves but of greater width and in line with the inner ends of said grooves transversely of the nose and spaced from the inner ends of the grooves.

2. A pneumatic tire or shoe comprising a carcass and a deep nose-portion divided by frequent deep, transverse grooves into load-supporting parts whose outer sides at the sides of the tire are weakened over a large area by recesses formed therein, said recesses being deepest at a zone between their top and bottom boundaries and thence graduated in depth toward said boundaries.

3. A pneumatic tire or shoe comprising a carcass and a deep nose-portion divided by frequent deep, transverse grooves into load-supporting parts whose outer sides at the sides of the tire are weakened over a large area by recesses formed therein, said recesses being deepest at a zone between their top and bottom boundaries and thence graduated in depth toward both their top and bottom and their side boundaries.

4. A pneumatic tire or shoe comprising a deep nose portion divided by frequent deep, transverse grooves alternately terminating short of the opposite sides of the tire, defining load supporting parts and recesses formed in said parts and of less inward extension than the grooves, the side boundaries of the individual recesses converging toward each other in the direction of the tread.

5. A pneumatic tire or shoe comprising a carcass and a deep nose-portion divided by frequent deep, transverse grooves into load-supporting parts whose outer sides at the sides of the tire are weakened over a large area by recesses formed therein, said recesses being deepest at a zone between their top and bottom boundaries and thence graduated in depth toward said boundaries, the side boundaries of the individual recesses converging toward each other in the direction of the tread.

6. A pneumatic tire or shoe comprising a carcass and a deep nose-portion divided by frequent deep, transverse grooves into load-supporting parts whose outer sides at the sides of the tire are weakened over a large area by recesses formed therein, said recesses being deepest at a zone between their top and bottom boundaries and thence graduated in depth toward both their top and bottom and their side boundaries, the side boundaries of the individual recesses converging toward each other in the direction of the tread.

7. A pneumatic tire or shoe comprising a carcass and a nose-portion divided into load-supporting parts by frequent transverse grooves substantially as deep as the nose-portion itself extending alternately from the sides of the tire past the center of the tread in order to overlap each other, the outer sides of said load-supporting parts at the sides of the tire having large area recesses formed therein.

8. A pneumatic tire or shoe comprising a carcass and a nose-portion divided into load-supporting parts by frequent transverse grooves substantially as deep as the nose-portion itself extending alternately from the sides of the tire past the center of the tread in order to overlap each other, the outer sides of said load-supporting parts at the sides of the tire having large area recesses formed therein, said recesses being deepest at a zone between their top and bottom boundaries and thence graduated in depth toward said boundaries.

9. A pneumatic tire or shoe comprising a carcass and a nose-portion divided into load-supporting parts by frequent transverse grooves substantially as deep as the nose-portion itself extending alternately from the sides of the tire past the center of the tread in order to overlap each other, the outer sides of said load-supporting parts at the sides of the tire having large area recesses formed therein, said recesses being deepest at a zone between their top and bottom boundaries and thence graduated in depth toward both their top and bottom and their side boundaries.

10. A pneumatic tire or shoe comprising a carcass and a nose-portion divided into load-supporting parts by frequent transverse grooves substantially as deep as the nose-portion itself extending alternately from the sides of the tire past the center of the tread in order to overlap each other, the outer sides of said load-supporting parts at the sides of the tire having large area recesses formed therein, the side boundaries of the individual recesses converging toward each other in the direction of the tread.

11. A pneumatic tire or shoe comprising a carcass and a nose-portion divided into load-supporting parts by frequent transverse grooves substantially as deep as the nose-portion itself extending alternately from the sides of the tire past the center of the tread in order to overlap each other, the outer sides of said load-supporting parts at the sides of the tire having large area recesses formed therein, said recesses being deepest at a zone between their top and bottom boundaries and thence graduated in depth toward said boundaries, the side boundaries of the individual recesses converging toward each other in the direction of the tread.

12. A pneumatic tire or shoe comprising a carcass and a nose-portion divided into load-supporting parts by frequent transverse grooves substantially as deep as the nose-portion itself extending alternately from the sides of the tire past the center of the tread in order to overlap each other, the outer sides of said load-supporting parts at the sides of the tire having large area recesses formed therein, said recesses being deepest at a zone between their top and bottom boundaries and thence graduated in depth toward both their top and bottom and their side boundaries, the side boundaries of the individual recesses converging toward each other in the direction of the tread.

In testimony whereof, I affix my signature in presence of two witnesses.

MAX CYRUS OVERMAN.

Witnesses:
  E. W. SCHERR, Jr.,
  JOSEPH NEUSTADT.

Correction in Letters Patent No. 1,264,205.

It is hereby certified that in Letters Patent No. 1,264,205, granted April 30, 1918, upon the application of Max Cyrus Overman, of New York, N. Y., for an improvement in "Tires," an error appears in the printed specification requiring correction as follows: Page 1, line 97, before the word "boundaries" insert the word *side;* and that the said Letters Patent should be read with this correction therein that the same may conform to the record of the case in the Patent Office.

Signed and sealed this 4th day of June, A. D., 1918.

[SEAL.]

F. W. H. CLAY,
*Acting Commissioner of Patents.*

Cl. 152—14.